(12) United States Patent
Kanno

(10) Patent No.: US 8,367,259 B2
(45) Date of Patent: Feb. 5, 2013

(54) FUEL CELL SYSTEM

(75) Inventor: Yoshihito Kanno, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1064 days.

(21) Appl. No.: 12/282,549

(22) PCT Filed: Feb. 18, 2008

(86) PCT No.: PCT/JP2008/052610
§ 371 (c)(1),
(2), (4) Date: Sep. 11, 2008

(87) PCT Pub. No.: WO2008/102715
PCT Pub. Date: Aug. 28, 2008

(65) Prior Publication Data
US 2009/0029229 A1    Jan. 29, 2009

(30) Foreign Application Priority Data
Feb. 21, 2007   (JP) ................. 2007-040532

(51) Int. Cl.
*H01M 8/04*   (2006.01)

(52) U.S. Cl. ............ 429/429; 429/431; 429/444

(58) Field of Classification Search ........... 429/400–535
See application file for complete search history.

(56) References Cited

U.S. PATENT DOCUMENTS

| | | | | |
|---|---|---|---|---|
| 6,558,827 B1 * | 5/2003 | Reiser | ............ | 429/415 |
| 2003/0194586 A1 * | 10/2003 | Sugiura et al. | ............ | 429/13 |
| 2004/0214059 A1 * | 10/2004 | Enjoji et al. | ............ | 429/22 |
| 2004/0241504 A1 * | 12/2004 | Summers et al. | ............ | 429/13 |
| 2006/0051635 A1 * | 3/2006 | Kamihara | ............ | 429/25 |

FOREIGN PATENT DOCUMENTS

| | | |
|---|---|---|
| JP | 9-312167 | 12/1997 |
| JP | 2004-185974 | 7/2004 |
| JP | 2005-116220 | 4/2005 |
| JP | 2005-243477 | 9/2005 |

(Continued)

OTHER PUBLICATIONS

English Translation of the International Preliminary Report on Patentability, mailed Sep. 3, 2009, in PCT/JP2008/052610.

*Primary Examiner* — Jennifer McNeil
*Assistant Examiner* — James Lee
(74) *Attorney, Agent, or Firm* — Finnegan, Henderson, Farabow, Garrett & Dunner, LLP

(57) ABSTRACT

The present invention has been devised in order to solve the problems described above, and an object of the present invention is to provide a fuel cell system that can discharge an impurity in an anode gas flow channel while suppressing wasteful discharge of a fuel gas to the outside of the system. An exhaust valve is connected to a downstream end of an anode gas flow channel of a fuel cell. The exhaust valve has an exhaust mode in which a substantially smaller amount of gas than the consumption of a fuel gas in the anode gas flow channel is discharged to the outside of the system. After a request to stop electric power generation by the fuel cell, the output current value of the fuel cell is increased to a predetermined value. Then, the exhaust valve is set in the exhaust mode before or when the output current value is increased, and the discharge flow rate of the exhaust valve is increased in accordance with the increase of the output current value.

11 Claims, 7 Drawing Sheets

FOREIGN PATENT DOCUMENTS

| | | |
|---|---|---|
| JP | 2005-302451 | 10/2005 |
| JP | 2005-353303 | 12/2005 |
| JP | 2005-353569 | 12/2005 |
| JP | 2006-12553 | 1/2006 |
| JP | 2006-19124 | 1/2006 |
| WO | WO 2005/069417 A2 * | 7/2005 |

* cited by examiner

FUEL CELL SYSTEM

TECHNICAL FIELD

The present invention relates to a fuel cell system having a fuel cell that generates an electric power using a fuel gas supplied to an anode thereof and air supplied to a cathode thereof.

BACKGROUND ART

As disclosed in Japanese Patent Laid-Open No. 2005-353569, for example, there is known a fuel cell system that confines the fuel gas in the fuel cell (referred to as anode dead end system hereinafter). In the anode dead end system, impurities, such as nitrogen and water, are accumulated in the anode gas flow channel of the fuel cell during operation. Thus, the conventional anode dead end system open the exhaust valve at appropriate times to discharge the impurities accumulated in the anode gas flow channel to the outside of the system at the downstream end of the anode.

Patent literature 1: Japanese Patent Laid-Open No. 2005-353569
Patent literature 2: Japanese Patent Laid-Open No. 2005-353303
Patent literature 3: Japanese Patent Laid-Open No. 2005-243477
Patent literature 4: Japanese Patent Laid-Open No. 9-312167

DISCLOSURE OF THE INVENTION

Problem to be Solved by the Invention

However, for the conventional system, when the exhaust valve is opened, not only the impurities but also the fuel gas in the anode gas flow channel are discharged. In terms of improvement of fuel economy, wasteful discharge of the fuel gas is preferably suppressed.

The present invention has been devised to solve the problem described above. An object of the present invention is to provide a fuel cell system that can discharge an impurity in an anode gas flow channel while suppressing wasteful discharge of a fuel gas to the outside of the system.

Means for Solving the Problem

To achieves the above-mentioned purpose, the first aspect of the present invention is a fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the consumption of the fuel gas in said anode gas flow channel is discharged to the outside of the system;
output controlling means that increases the output current value of the fuel cell to a predetermined value after a request to stop electric power generation by said fuel cell; and
discharge controlling means that sets said exhaust mechanism in the exhaust mode before or when said output controlling means increases the output current value.

The second aspect of the present invention is the fuel cell system according to the first aspect of the present invention, wherein said exhaust mechanism is capable of changing the discharge flow rate, and
said discharge controlling means increases the discharge flow rate of said exhaust mechanism in accordance with the increase of the output current value by said output controlling means.

The third aspect of the present invention is the fuel cell system according to the first or the second aspect of the present invention, further comprising:
an electric power storage connected to said fuel cell,
wherein at least part of the increment of the output power due to the increase of the output current value by said output controlling means is stored in said electric power storage.

To achieves the above-mentioned purpose, the fourth aspect of the present invention is a fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the consumption of the fuel gas in said anode gas flow channel is discharged to the outside of the system;
purge request determining means that determines whether or not there is a request to perform purging of said fuel cell;
output controlling means that increases the output current value of the fuel cell to a predetermined value after it is determined that there is a request to perform purging; and
discharge controlling means that sets said exhaust mechanism in said exhaust mode before or when said output controlling means increases the output current value.

The fifth aspect of the present invention is the fuel cell system according to the fourth aspect of the present invention, wherein said purge request determining means includes intermittent-operation-time purge request determining means that determines that there is a request to perform purging of said fuel cell when there is a request to switch the operation of said fuel cell to an intermittent operation in which electric power generation by said fuel cell is intermittently stopped.

The sixth aspect of the present invention is the fuel cell system according to the fourth or the fifth aspect of the present invention, wherein said exhaust mechanism is capable of changing the discharge flow rate, and
said discharge controlling means increases the discharge flow rate of said exhaust mechanism in accordance with the increase of the output current value by said output controlling means.

The seventh aspect of the present invention is a fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the consumption of the fuel gas in said anode gas flow channel is discharged to the outside of the system;
first measuring means that measures a physical quantity relating to the flow rate of the fuel gas in said anode gas flow channel;
second measuring means that measures a physical quantity relating to the diffusion rate of an impurity in said anode gas flow channel;
flow rate controlling means that increases the flow rate of the fuel gas so that the flow rate of the fuel gas in said anode gas flow channel is higher than the diffusion rate of said impurity in the anode gas flow channel after a request to stop electric power generation by said fuel cell; and discharge controlling means that sets said exhaust mechanism in said exhaust mode before or when said flow rate controlling means increases the flow rate of the fuel gas.

The eighth aspect of the present invention is a fuel cell system, comprising:

a fuel cell that generates an electric power using a fuel gas supplied to an anode thereof and air supplied to a cathode thereof;

an exhaust mechanism connected to a downstream end of an anode gas flow channel;

purge request determining means that determines whether or not there is a request to perform purging of said fuel cell;

output controlling means that increases the output current value of the fuel cell to a predetermined value after it is determined that there is a request to perform purging; and discharge controlling means that keeps said exhaust mechanism closed at least until said output controlling means increases the output current value after it is determined that there is a request to perform purging of said fuel cell and switches said exhaust mechanism to an open state after the output current value is increased.

Advantages of the Invention

According to the first aspect of the present invention, since a substantially smaller amount of gas than the consumption of fuel gas in the anode gas flow channel is discharged to the outside of the system, the impurity accumulated at the downstream end of the anode gas flow channel can be discharged to the outside of the system little by little while suppressing wasteful discharge of the fuel gas. Thus, the impurity in the anode gas flow channel can be discharged while suppressing wasteful discharge of the fuel gas to the outside of the system. In addition, in operation with the exhaust mechanism set in the exhaust mode, the higher the flow rate of the fuel gas, the smaller the amount of the impurity in the anode gas flow channel becomes. According to the first aspect of the present invention, such a state can be deliberately produced after a request to halt operation, so that the fuel cell can be halted by reducing the impurity in the anode gas flow channel while suppressing wasteful discharge of the fuel gas.

According to the second aspect of the present invention, the flow rate of discharged gas can be increased in accordance with the increase of the amount of the impurity in the anode gas flow channel due to the increase of the output current value of the fuel cell. As a result, when the impurity is discharged while suppressing wasteful discharge of hydrogen, the impurity concentration in the downstream part of the anode gas flow channel can be prevented from excessively increasing.

According to the third aspect of the present invention, the generated electric power increased when the impurity is collected in the downstream part of the anode gas flow channel can be efficiently used.

According to the fourth aspect of the present invention, since a substantially smaller amount of gas than the consumption of fuel gas in the anode gas flow channel is discharged to the outside of the system, the impurity accumulated at the downstream end of the anode gas flow channel can be discharged to the outside of the system little by little while suppressing wasteful discharge of the fuel gas. Thus, the impurity in the anode gas flow channel can be discharged while suppressing wasteful discharge of the fuel gas to the outside of the system. In addition, in operation with the exhaust mechanism set in the exhaust mode, the higher the flow rate of the fuel gas, the smaller the amount of the impurity in the anode gas flow channel becomes. According to the fourth aspect, such a state can be deliberately produced after a request to perform purging, so that the impurity in the anode gas flow channel can be discharged while suppressing wasteful discharge of the fuel gas.

According to the fifth aspect of the present invention, after a request to start an intermittent operation, the impurity in the anode gas flow channel can be reduced while suppressing wasteful discharge of the fuel gas to the outside of the system.

According to the sixth aspect of the present invention, the flow rate of discharged gas can be increased in accordance with the increase of the amount of the impurity in the downstream part of the anode gas flow channel due to the increase of the output current value of the fuel cell. As a result, when the impurity is discharged while suppressing wasteful discharge of hydrogen, the impurity concentration in the downstream part of the anode gas flow channel can be prevented from excessively increasing.

According to the seventh aspect of the present invention, as in the first aspect of the present invention, the impurity accumulated at the downstream end of the anode gas flow channel can be discharged to the outside of the system little by little while suppressing wasteful discharge of the fuel gas. In addition, as in the first aspect of the present invention, the fuel cell can be halted by reducing the impurity in the anode gas flow channel while suppressing wasteful discharge of the fuel gas.

According to the eighth aspect of the present invention, gas discharge can be performed in a state where the impurity is collected in the downstream part of the anode gas flow channel by increasing the output current value after a request to perform purging of the fuel cell. As a result, the impurity in the anode gas flow channel can be discharged while suppressing wasteful discharge of the fuel gas to the outside of the system.

DESCRIPTION OF NOTATIONS

| | |
|---|---|
| 2 | fuel cell stack |
| 4 | high pressure hydrogen tank |
| 6 | hydrogen supply pipe |
| 8 | hydrogen pressure regulating valve |
| 10 | hydrogen inlet valve |
| 12 | exhaust pipe |
| 14 | exhaust valve |
| 20 | control unit |
| 22 | ammeter |
| 24 | temperature sensor |
| 26 | pressure sensor |
| 30 | air supply pipe |
| 32 | air pump |
| 34 | exhaust pipe |
| 40 | membrane electrode assembly |
| 42 | anode side gas flow channel |
| 44 | cathode side gas flow channel |
| 50 | load |
| 52 | converter |
| 54 | electric power storage |

BEST MODE FOR CARRYING OUT THE INVENTION

Embodiment 1

[Configuration of System According to Embodiment 1]

Figure 1:
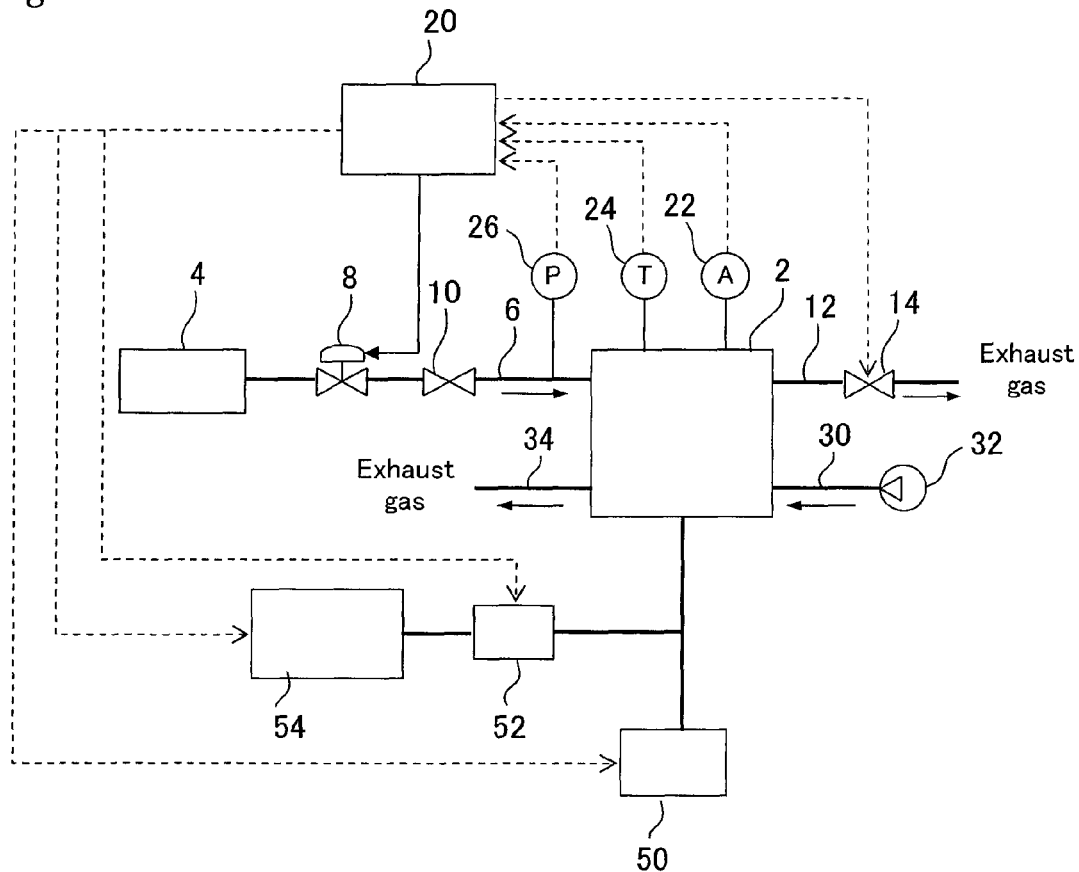
FIG. 1 is a schematic diagram showing a configuration of a fuel cell system according to the embodiment 1 of the present invention.

FIG. 1 is a schematic diagram showing a configuration of a fuel cell system according to the present invention. The fuel cell system supplies an electric power generated by a fuel cell 2 to a load, such as a motor. In general, the fuel cell 2 has the form of a fuel cell stack composed of a plurality of cells stacked one on another. Although not shown, each cell has a pair of current collectors and a membrane electrode assembly interposed therebetween. The membrane electrode assembly comprises a solid polymer electrolyte membrane, catalyst portions formed on the opposite surfaces of the solid polymer electrolyte membrane, and gas diffusion layers, such as a carbon sheet, formed on the surfaces of the catalyst portions. Each current collector serves also as a separator between adjacent two membrane electrode assemblies. Each cell generates electric power using hydrogen as a fuel gas supplied to the anode thereof and air supplied to the cathode thereof. Details of the configuration of the cell will be described later in conjunction with a physical phenomenon occurring in the cell in the description of an operation according to the embodiment 1.

A hydrogen supply pipe 6 for supplying hydrogen from a high pressure hydrogen tank 4 to the fuel cell 2 is connected to the fuel cell 2. As seen from the upstream side, the hydrogen supply pipe 6 includes a hydrogen pressure regulating valve 8 and then a hydrogen inlet valve 10. Hydrogen is supplied to the fuel cell 2 after the pressure is reduced to a desired pressure by the pressure regulating valve 8. The hydrogen supplied to the fuel cell 2 is distributed to the anodes of the cells through a supply manifold (not shown) in the fuel cell 2.

The fuel cell system according to this embodiment has an exhaust pipe 12 for discharging an anode gas from the fuel cell 2. The exhaust pipe 12 is connected to the downstream end of an anode gas flow channel of each cell via an exhaust manifold (not shown) in the fuel cell 2. Gas in the anode gas flow channel (anode gas) is collected in the exhaust manifold and discharged to the exhaust pipe 12. The tip end of the exhaust pipe 12 opens into the atmosphere or is connected to a diluter.

The exhaust pipe 12 has a duty-controllable electromagnetic exhaust valve 14 as an exhaust mechanism that changes the state of communication of the exhaust pipe 12. The exhaust valve 14 is preferably of the injector type, which is superior in flow rate controllability. The exhaust valve 14 can selectively operate in a closed mode in which the exhaust valve 14 is completely closed (that is, the duty ratio is zero) or in an exhaust mode in which the exhaust valve 14 is controlled to open at a predetermined duty ratio. When the closed mode is selected, the communication of the anode gas flow channel of the fuel cell 2 to the outside of the system is blocked.

On the other hand, when the exhaust mode is selected, the anode gas flow channel communicates with the outside of the system, and the anode gas can be discharged to the outside of the system. However, the duty ratio in the exhaust mode is low, and the flow rate of the anode gas discharged to the outside of the system is regulated to an extremely small value compared with the consumption of hydrogen in the anode gas flow channel. In the following, the operation of the fuel cell system in the closed mode will be referred to as "anode dead end operation", and the operation of the fuel cell system in the exhaust mode will be referred to as "small amount discharge operation". In the following description, the amount of gas discharged to the outside of the system through the exhaust valve 14 in a unit time will be referred to also as "discharge flow rate".

The fuel cell 2 is connected to an air supply pipe 30 for supplying air. The air supply pipe 30 is provided with an air pump 32. Air is sucked by the air pump 32 into the air supply pipe 30 and supplied to the fuel cell 2. The air supplied to the fuel cell 2 is distributed to the cathodes of the cells through a supply manifold in the fuel cell 2. The air passing through the cathodes of the cells is collected in an exhaust manifold in the fuel cell 2 and discharged to an exhaust pipe 34.

The system according to the embodiment 1 has an electronic control unit (ECU) 20. The ECU 20 is connected to an ammeter 22 and a temperature sensor 24 connected to the fuel cell 2. The hydrogen supply pipe 6 is provided with a pressure sensor 26. The pressure sensor 26 is connected to the ECU 20. The exhaust valve 14 is connected to the ECU 20. The ECU 20 transmits a control signal to the exhaust valve 14 to achieve discharge flow rate control involving the closed mode and the exhaust mode.

In the system according to the embodiment 1, a load 50 is connected to the fuel cell 2. The fuel cell 2 is also connected to an electric power storage 54 via a converter 52. The load 50, which consumes the electric power supplied from the fuel cell 2, can be a motor, for example. In the system according to this embodiment, the electric power from the fuel cell 2 can be appropriately supplied to the load 50 or the electric power storage 54. Techniques used to construct such a fuel cell system are well known, and detailed descriptions thereof will be omitted.

[Operations of System According to Embodiment 1 in Normal Operation]

In the following, operations of the system according to this embodiment in the normal operation and a phenomenon occurring in the fuel cell 2 in the normal operation will be described with reference to FIG. 2. In the following, there will be first described accumulation of an impurity in the anode gas flow channel of a cell during operation of the anode dead end system. Then, as operational states occurring in the normal operation according to this embodiment, the continuous small amount discharge operation and the anode dead end operation will be described, and then, a method of switching between the two operational states will be described.

Figure 2:
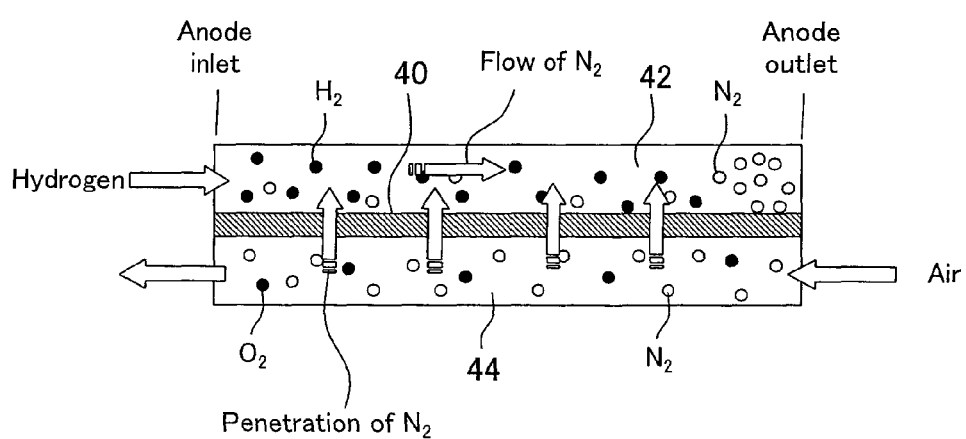
FIG. 2 is a schematic diagram showing an internal structure of a cell and a phenomenon occurring in the cell.

FIG. 2 is a schematic diagram showing an internal structure of a cell in the fuel cell 2 and a phenomenon occurring in the cell. FIG. 2 shows only parts involved with the characteristics of the present invention and does not show parts that are not involved with the characteristics of the present invention, such as the current collectors and the manifolds. In the following, description will be made with reference to both FIGS. 1 and 2.

As shown in FIG. 2, gas flow channels 42 and 44 are formed along the opposite surfaces of a membrane electrode assembly 40. In the normal operation, hydrogen is supplied to the gas flow channel 42 for the anode of the membrane electrode assembly 40. Air is supplied to the gas flow channel 44 for the cathode of the membrane electrode assembly 40. As a result, an electrochemical reaction occurs via the membrane electrode assembly 40 to generate electric power. It is to be noted that the shape and structure of the gas flow channels 42 and 44 are not particularly limited. For example, grooves can be formed in the surfaces of each current collector (separator), and the grooves can be used as the gas flow channels 42 and 44. Alternatively, a porous layer made of a conductive material can be formed between each current collector and the adjacent membrane electrode assembly 40, and the continuous pores in the porous layers can be used as the gas flow channels 42 and 44.

The air supplied to the cathode gas flow channel 44 contains not only oxygen ($O_2$) used for electric power generation but also nitrogen ($N_2$). Nitrogen is an inert gas and does not contribute to electric power generation, so that the nitrogen is discharged to the outside of the system through the cathode gas flow channel 44. However, part of the nitrogen passes through the membrane electrode assembly 40 as schematically shown by the arrows in FIG. 2 and enters the anode gas flow channel 42. The movement of the nitrogen into the anode gas flow channel 42 is caused by the difference in nitrogen partial pressure between the cathode gas flow channel 44 and the anode gas flow channel 42. The nitrogen ($N_2$) having passed through the membrane electrode assembly 40 flows to the downstream of the anode gas flow channel 42 with the hydrogen ($H_2$) flowing in the anode gas flow channel 4 as schematically shown by the arrows in FIG. 2.

Air contains not only nitrogen but also other impurities that don't contribute to electric power generation, such as water vapor and carbon dioxide. However, the concentration of those impurities in the air is extremely lower than the concentration of nitrogen, and therefore, nitrogen is exclusively described as the impurity in this specification. However, it does not mean that other substances than nitrogen are not supposed to be impurities in the present invention.

If the nitrogen having entered the anode gas flow channel 42 as a result of the partial pressure difference covers the surface of the membrane electrode assembly 40, the electromotive reaction on the catalyst is inhibited. This can cause a decrease in output voltage or a deterioration of the membrane electrode assembly 40 due to an abnormal potential. Thus, according to this embodiment, the continuous small amount discharge operation in which the exhaust valve 12 is set in the exhaust mode is carried out to prevent accumulation of nitrogen at the downstream end of the anode gas flow channel 42.

When the exhaust valve 14 is set in the exhaust mode, a substantially smaller amount of gas than the consumption of hydrogen in the anode gas flow channel 42 can be discharged to the outside of the system. Thus, the nitrogen accumulated at the downstream end of the anode gas flow channel 42 can be discharged to the outside of the system little by little. Therefore, accumulation of nitrogen that leads to degradation of the performance of the fuel cell can be prevented while suppressing wasteful discharge of hydrogen.

Figure 3:
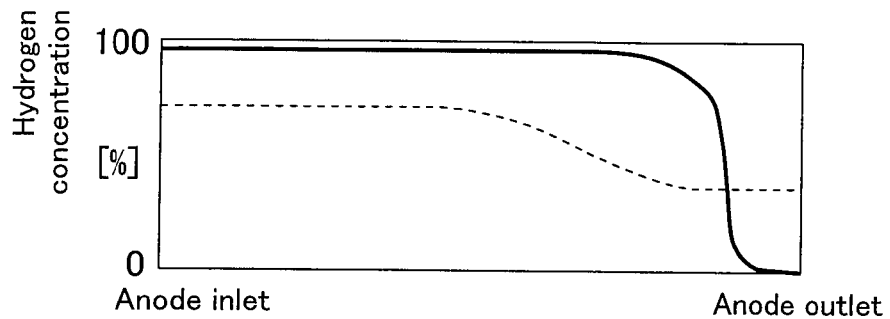
FIG. 3 is a graph showing the relationship between hydrogen concentration distribution in the anode gas flow channel and current value.

The distribution of impurities in the anode gas flow channel varies with various kinds of factors. FIG. 3 is a graph showing the hydrogen concentration distribution in the anode gas flow channel 42 in the anode dead end operation. The nitrogen concentration can be determined by subtracting the hydrogen concentration from 100%. The solid line in FIG. 3 shows a hydrogen concentration distribution in a case where nitrogen is accumulated at the downstream end of the anode gas flow channel 42. The continuous small amount discharge operation is effective in such a case where nitrogen can be accumulated at the downstream end of the anode gas flow channel 42.

The nitrogen distribution in the anode gas flow channel 42 is determined by the state of the flow of nitrogen in the anode gas flow channel 42. When nitrogen flows downstream in the anode gas flow channel 42 as schematically shown by the arrows in FIG. 2, nitrogen is inevitably accumulated at the downstream end. The flow of nitrogen in the anode gas flow channel 42 is determined by the diffusion rate of nitrogen in the anode gas flow channel 42 and the flow rate of hydrogen in the anode gas flow channel 42. If the flow rate of hydrogen is higher than the diffusion rate of nitrogen, the nitrogen having passed through the membrane electrode assembly 40 is not diffused upstream in the anode gas flow channel 42 but is flowed downstream. As a result, the hydrogen concentration distribution shown by the solid line in FIG. 3 occurs.

If the flow rate of hydrogen is lower than the diffusion rate of nitrogen, the nitrogen is diffused upstream in the anode gas flow channel 42, and the hydrogen concentration distribution shown by the dashed line in FIG. 3 occurs, for example. In the case of the hydrogen concentration distribution shown by the dashed line in FIG. 3, or in other words, in the case where nitrogen is dispersed in the anode gas flow channel 42, hydrogen is wastefully discharged if discharge is carried out. This is because nitrogen is not accumulated at the downstream end of the anode gas flow channel 42. In such a case, the anode dead end operation can be selected to suppress discharge of hydrogen.

The decision as to which of the anode dead end operation and the continuous small amount discharge operation is used has to be made based on whether or not nitrogen can be accumulated at the downstream end of the anode gas flow channel 42. Thus, the fuel cell system according to this embodiment indirectly detects the downstream flow of nitrogen in the anode gas flow channel 42 in the manner described below.

First, the flow of nitrogen in the anode gas flow channel 42 is determined by the diffusion rate of nitrogen in the anode gas flow channel 42 and the flow rate of hydrogen in the anode gas flow channel 42. If the flow rate of hydrogen is higher than the diffusion rate of nitrogen, the nitrogen having passed through the membrane electrode assembly 40 is not diffused upstream in the anode gas flow channel 42 but is flowed downstream. As a result, the hydrogen concentration distribution shown by the solid line in FIG. 3 occurs. On the other hand, if the flow rate of hydrogen is lower than the diffusion rate of nitrogen, the nitrogen is diffused upstream in the anode gas flow channel 42, and the hydrogen concentration distribution shown by the dashed line in FIG. 3 occurs.

The fuel cell system according to this embodiment does not directly measure the flow rate of hydrogen in the anode gas flow channel 42 but measures the value of the output current of the fuel cell 2 as a physical quantity relating to the flow rate of hydrogen. The flow rate of hydrogen flowing into the anode gas flow channel 42 is uniquely determined by the output current of the fuel cell 2 if the anode gas flow channel 42 has a uniform cross-sectional shape. The current of the fuel cell 2 is measured by the ammeter 22 attached to the fuel cell 2.

Furthermore, the fuel cell system according to this embodiment does not directly measure the diffusion rate of nitrogen in the anode gas flow channel 42 but measures the gas pressure and the gas temperature in the anode gas flow channel 42 as physical quantities relating to the diffusion rate of nitrogen. The diffusion rate of nitrogen can be expressed as a function of the gas temperature and the gas pressure in the anode gas flow channel 42. The gas pressure in the anode gas flow channel 42 is measured by the pressure sensor 26 attached to the hydrogen supply pipe 6 at the inlet of the fuel cell 2. The gas temperature in the anode gas flow channel 42 is substantially equal to the temperature of the whole of the fuel cell 2 and therefore can be indirectly measured by the temperature sensor 24 attached to the fuel cell 2. Of course, the gas temperature in the anode gas flow channel 42 can also be directly measured.

In the fuel cell system according to this embodiment, The ECU 20 calculates a reference value from the measurement values from the pressure sensor 26 and the temperature sensor 24 and calculates a comparison target value (of the same dimension as the reference value) to be compared with the reference value from the measurement value from the ammeter 22. The ECU 20 properly determines whether or not nitrogen can be accumulated at the downstream end of the anode gas flow channel 42 based on the comparison between the reference value and the comparison target value and switches the operation mode of the exhaust valve 14 based on the result of the determination.

[Operation of System According to Embodiment 1 During Halt]

Now, an operation of the system according to this embodiment during halt will be described. As described above, in the system according to this embodiment, nitrogen (an impurity) exists in the anode gas flow channel. If the fuel cell system is halted when a large amount of nitrogen is accumulated therein, the hydrogen concentration in the anode gas flow channel is low when the system is started next time. Thus, there is a possibility that the start-up performance is degraded.

This can be effectively prevented by positively discharging (purging) the impurity when the system is halted. However, in a state where both nitrogen and hydrogen exist in the anode gas flow channel, not only the impurity but also hydrogen is discharged when the exhaust valve is opened. In particular, in the state where hydrogen is widely distributed in the anode gas flow channel as shown by the dotted line in FIG. 3, a larger amount of hydrogen is discharged wastefully. As described above with regard to the normal operation, in terms of improvement of fuel economy, it is desirable to suppress wasteful discharge of hydrogen.

As shown in FIG. 3, the distribution of nitrogen in the anode gas flow channel varies with the flow rate of hydrogen. The flow rate of hydrogen is uniquely determined by the output current of the fuel cell 2 if the anode gas flow channel 42 has a uniform cross-sectional shape. As the flow rate of hydrogen is higher than the diffusion rate of nitrogen and the difference therebetween is greater, the nitrogen concentration gradient becomes steeper.

In the continuous small amount discharge operation, as the concentration gradient of nitrogen becomes steeper as a result of pushing of nitrogen to the downstream end of the anode gas flow channel, the amount of nitrogen in the anode gas flow channel decreases. Thus, in this embodiment, taking advantage of such a characteristic of the continuous small amount discharge operation, nitrogen is discharged according to the method described below. First, the load 50 or the converter 52 is controlled to increase the load on the fuel cell 2, thereby increasing the output current value. As a result, the flow rate of hydrogen increases, and the concentration gradient of nitrogen becomes steeper. As a result, a state where the amount of the impurity in the anode gas flow channel is small is deliberately produced. Therefore, the amount of nitrogen in the anode gas flow channel 42 can be reduced while suppressing wasteful discharge of hydrogen when halting the fuel cell 2.

When the flow rate of hydrogen increases, and the concentration gradient of nitrogen becomes steeper, the nitrogen concentration increases and at the same time the hydrogen concentration decreases at the downstream end of the anode gas flow channel. As described above, it is not preferable that the nitrogen concentration becomes excessively high in the downstream part of the anode gas flow channel. Thus, in this embodiment, the discharge flow rate is increased in accordance with the increase of the flow rate of hydrogen. Thus, the discharged flow rate can be increased to cancel the increment of the amount of nitrogen in the downstream part. As a result, an excellent discharge control can be achieved by preventing the nitrogen concentration in the downstream part of the anode gas flow channel from becoming excessively high and at the same time suppressing wasteful discharge of hydrogen.

Figure 4:
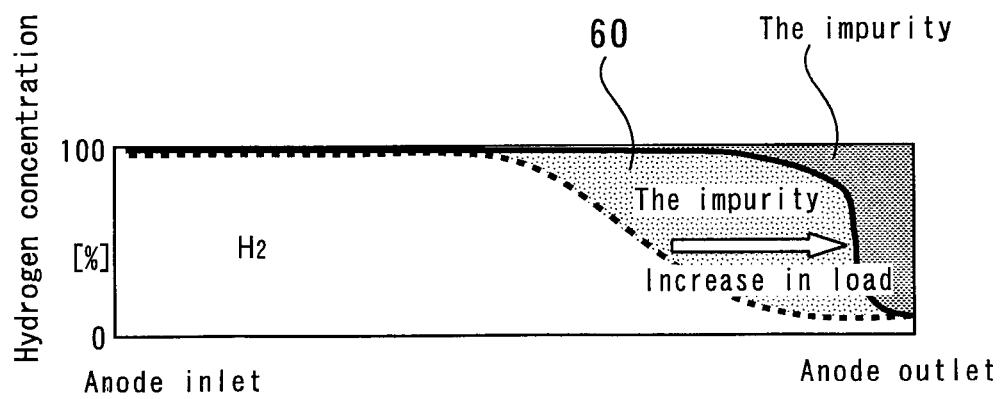
FIG. 4 is a diagram for illustrating a concept of the impurity discharge control according to embodiments of the present invention.

FIG. 4 is a diagram for illustrating a concept of the impurity discharge control according to this embodiment. In FIG. 4, the dotted line shows a state where nitrogen is widely distributed in the anode gas flow channel. In this embodiment, the output current is increased from this state, and the discharge flow rate of the exhaust valve is increased accordingly. As a result, as shown by the arrow in FIG. 4, nitrogen is pushed toward the downstream end of the anode gas flow channel and discharged. A region denoted by reference numeral 60 in FIG. 4 represents a region in which nitrogen has existed before discharge. As the amount of nitrogen in the downstream part increases, the amount of discharged nitrogen also increases. Thus, nitrogen is discharged while maintaining the hydrogen concentration in the downstream part of the anode gas flow channel at a predetermined value. Eventually, the amount of nitrogen in the anode gas flow channel is reduced as shown by the solid line in FIG. 4.

As described above, according to the method of this embodiment, after a request to stop electric power generation by the fuel cell, the output current value can be increased to reduce the amount of the impurity in the anode gas flow channel. Thus, the fuel cell can be halted after discharging the impurity in the anode gas flow channel while suppressing wasteful discharge of the fuel gas to the outside of the system. As a result, high start-up performance can be achieved when the system is started next time.

A conventional fuel cell system has a diluter to reduce the hydrogen concentration of the gas discharged to the outside of the system. However, according to this embodiment, the hydrogen concentration of the gas discharged to the outside of the system can be reduced by suppressing discharge of hydrogen. Therefore, the diluter can be downsized or omitted.

In addition, since the discharge flow rate is increased in accordance with the increase of the output current value of the fuel cell 2, the nitrogen concentration in the downstream part of the anode gas flow channel can be effectively prevented from becoming excessive when discharging nitrogen while suppressing wasteful discharge of hydrogen.

[Specific Processing According to Embodiment 1]

Figure 5:
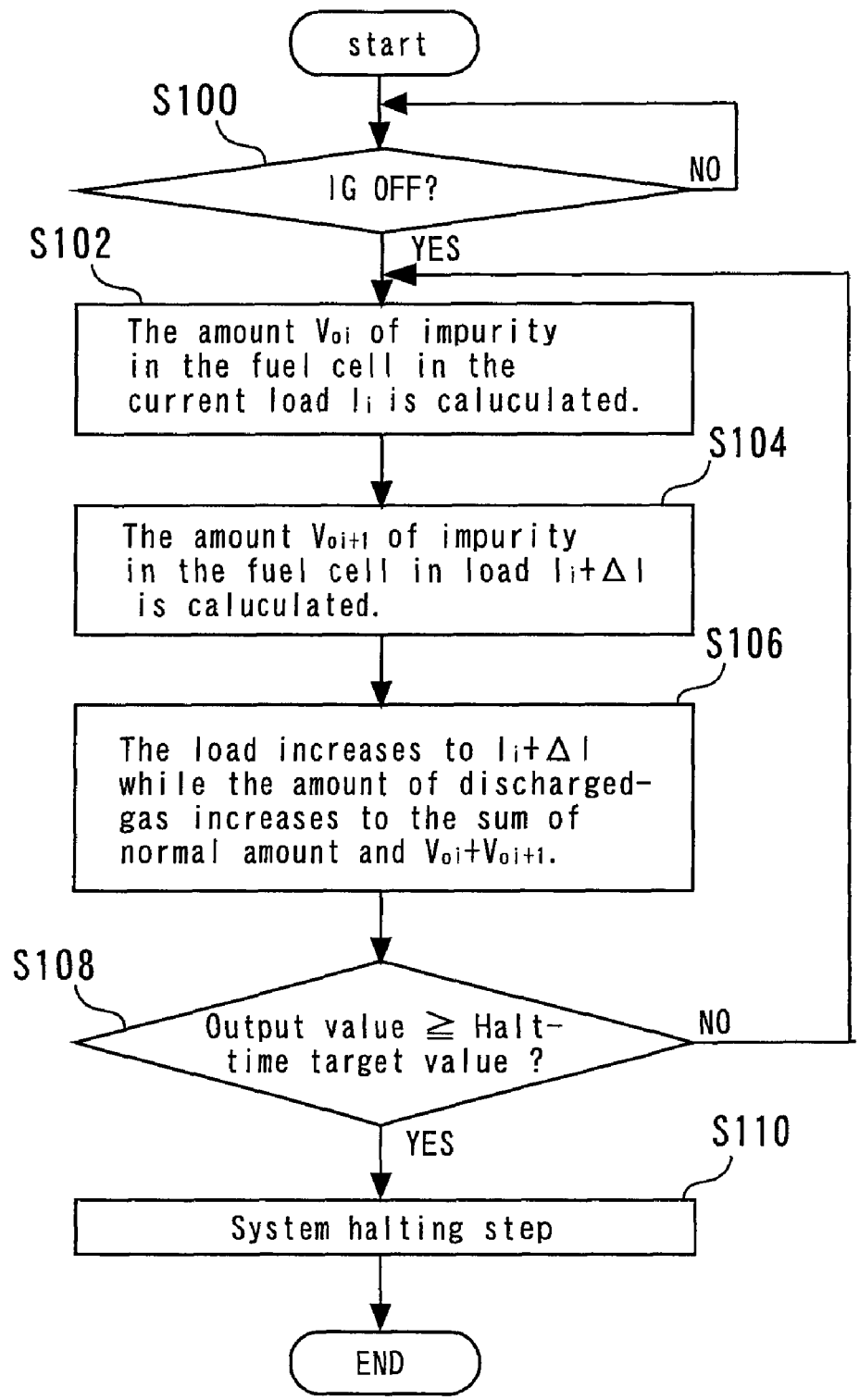
FIG. 5 is a flowchart showing a routine performed in one embodiment of the present invention.

In the following, with reference to FIG. 5, a specific process performed by the system according to the embodiment 1 will be described. FIG. 5 is a flowchart showing a routine performed in the embodiment 1. This flow is performed when the system according to the embodiment 1 is in operation. Although not shown in the routine of FIG. 5, the system according to this embodiment is controlled to operate as described above with regard to the normal operation until the control is interrupted by this routine.

Figure 6:
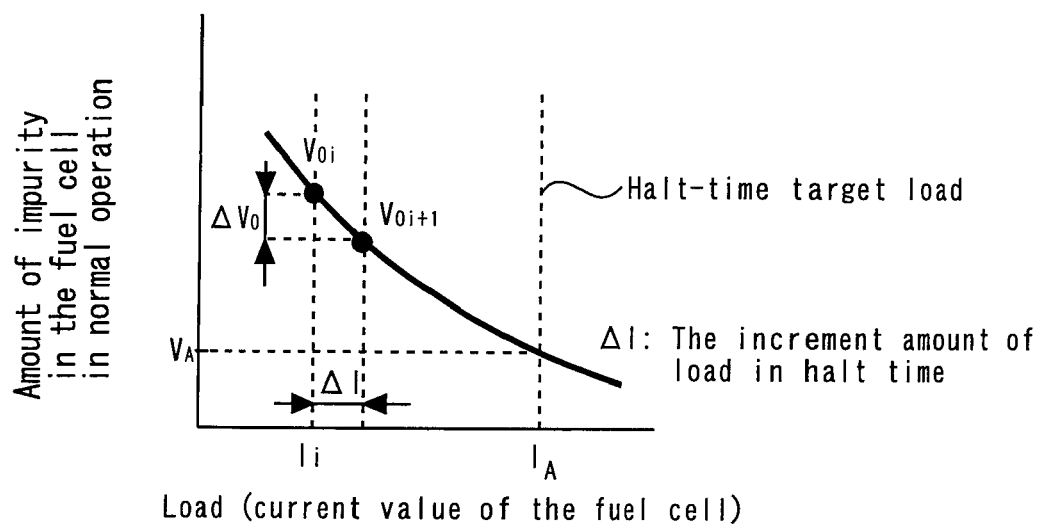
FIG. 6 is a map of the relationship between output of the fuel cell and amount of impurity in anode gas flow channel during the continuous small amount discharge operation according to the embodiment 1 of the present invention.

According to this embodiment, the ECU 20 previously stores a map, such as a map shown in FIG. 6. The map shown in FIG. 6 represents a correspondence between the output current value of the fuel cell 2 and the amount of the impurity (the amount of the impurity gas) in the anode gas flow channel 42, which is determined in advance by experiment or the like. The map shown in FIG. 6 is obtained by experimentally determining the amount of the impurity in the anode gas flow channel 42 by changing the output current value in the exhaust mode with a fixed discharge flow rate. As can be seen from the map shown in FIG. 6, in the continuous small amount discharge operation, the greater the output current value of the fuel cell 2, the smaller the amount of the impurity in the anode gas flow channel becomes. In this embodiment, taking advantage of such a characteristic of the continuous small amount discharge operation, the impurity is effectively discharged. During execution of the routine shown in FIG. 5, the map shown in FIG. 6 is appropriately referred to.

In the routine shown in FIG. 5, first, it is determined whether or not the ignition is in the OFF state (step S100). This step is intended to determine whether or not there is a request to halt the fuel cell 2. If the condition is not met in step S100, it is determined that the system still has to perform the normal operation, and the system waits for the condition to be met.

If the condition in step S100 is met, it is determined that a request to halt the system is acquired. In this case, in the routine shown in FIG. 5, the procedure from step S102 is performed to discharge the impurity in the anode gas flow channel 42 of the fuel cell 2. In step S102, the amount $V_{oi}$ of impurity in the fuel cell 2 in the current load state is calculated. Specifically, first, the amount $V_{oi}$ of impurity corresponding to the current output current value $I_i$ is determined by referring to the map shown in FIG. 6. Then, by referring to the map shown in FIG. 6 again, the amount $V_{oi+1}$ of impurity corresponding to the output current value $(I_i+\Delta I)$, which is the sum of the current output current value Ii and a predetermined increment $\Delta I$, is calculated (Step S104).

Then, the output current value is increased to $I_i+\Delta I$ while increasing the discharge flow rate so that the amount of the discharged gas increases by an increment $\Delta V_o$ ($=V_{oi}-V_{oi+1}$) in amount of the impurity (step S106). Specifically, first, the exhaust valve 14 is set in the exhaust mode. Then, the exhaust valve 14 is controlled to increase the amount of discharged gas by $\Delta V_o$ from the amount of discharged gas expected from the current discharge flow rate (the normal amount of discharged gas). The output current value is increased by controlling the load 50 or the converter 52.

When the output current is increased by $\Delta I$, it is expected that the flow rate of hydrogen increases, and the impurity concentration in the downstream part of the anode gas flow channel 42 increases. The processing in step S106 allows the discharge flow rate to be increased while suppressing such a concentration increase. Although not shown in the flowchart of FIG. 5, in this embodiment, an excessive electric power resulting from the increase of the output current value in step S106 is stored in the electric power storage 54.

Then, it is determined whether or not the current output current value is equal to or higher than a predetermined halt-time target value (step S108). Specifically, it is determined whether or not the output current value $I_i+\Delta I$ is equal to or higher than the halt-time target value $I_A$. The halt-time target value $I_A$ is previously defined in the map shown in FIG. 6 and serves as a basis for determination of whether or not discharge of the impurity is completed.

Through the procedure from step S102 to step S106, the amount of the impurity in the anode gas flow channel 42 varies with the output current as shown in FIG. 6. As a result, as the output current increases, the amount of the impurity in the anode gas flow channel 42 decreases. Thus, a target value $V_A$ of the amount of the impurity is defined to be an adequately small value, and the halt-time target value $I_A$ corresponding to the target value $V_A$ is determined. The impurity can be reduced with reliability by repeating the procedure from step S102 until the output current value becomes equal to or higher than the target value $V_A$.

If the condition is not met in step S108, it is determined that the amount of the impurity in the anode gas flow channel 42 is not sufficiently reduced. In this case, the procedure from step S102 is performed again. If the condition in step S108 is met, it is determined that the impurity is sufficiently discharged. Thus, the process proceeds to a system halting step S108, and the current routine is ended.

According to the process described above, the fuel cell 2 can be halted after the impurity is discharged while suppressing wasteful discharge of hydrogen to the outside of the system. In addition, since the amount of discharged gas is increased in accordance with the increase of the output current value of the fuel cell 2, the nitrogen concentration in the downstream part of the anode gas flow channel can be effectively prevented from being excessive. In addition, since the excessive electric power produced due to the increase of the output current value in step S106 is stored in the electric power storage 54, the generated electric power can be efficiently used.

In the embodiment 1, there has been described a case where switching of the exhaust valve 14 to the exhaust mode occurs during step S106. However, according to the control in the normal operation according to this embodiment, whether the exhaust valve 14 is in the exhaust mode or the closed mode depends on the output of the fuel cell 2. Therefore, the state of the exhaust valve 14 is checked in step S106, and if the exhaust valve 14 is already set in the exhaust mode, the exhaust mode can be continued. Even if the exhaust valve 14 is in the closed mode when the procedure from step S102 is started, there is no problem if the exhaust valve 14 is switched to the exhaust mode before the output current is increased in step S106.

In the embodiment 1 described above, the fuel cell 2 corresponds to the "fuel cell" according to the first aspect of the present invention described earlier, and the exhaust valve 14 corresponds to the "exhaust mechanism" according to the first aspect of the present invention described earlier. Furthermore, in the specific processings in steps S102 to S108 according to the embodiment 1, the control of the output current value is associated with the "output controlling means" according to the first aspect of the present invention described earlier, the control of the exhaust valve 14 is associated with the "discharge controlling means" according to the first aspect of the present invention described earlier, and the halt-time target valve $I_A$ corresponds to the "predetermined value" according to the first aspect of the present invention.

[Modifications of Embodiment 1]
(First Modification)

In the embodiment 1, as a method of controlling the system during the normal operation, there is used a method of switching the operational state between the anode dead end operation and the continuous small amount discharge operation based on a predetermined condition. However, the present invention is not limited thereto. That is, the discharge control during halt according to the embodiment 1 can be applied to a system that always performs the continuous small amount discharge during the normal operation, for example. The discharge control during halt according to the embodiment 1 can be applied to any system in which an impurity can enter the anode gas flow channel, and an impurity concentration gradient can occur in the anode gas flow channel (that is, any anode dead end system).

(Second Modification)

In the embodiment 1, after a request to stop electric power generation by the fuel cell, the output current value is increased to a predetermined value, and the discharge flow rate is increased in accordance with the increase of the output current value of the fuel cell 2. However, the present invention is not limited thereto. That is, when the output current value is increased to a predetermined value after a request to stop electric power generation by the fuel cell, the discharge flow rate does not always have to be increased in accordance with the increase of the output current value. Specifically, increasing the output current value (increasing the load contributed by the load 50) can be all performed in step S106 in the routine shown in FIG. 5. In this case, a valve that cannot change the discharge flow rate can be used as the exhaust valve 14.

[Another Modification]

In the embodiment 1, the excessive electric power due to the increase of the output current value in step S106 is stored in the electric power storage 54. However, the electric power does not always have to be stored in the electric power storage 54. The excess of electric power can be consumed by another device in the system, for example.

The halt-time target value $I_A$ is affected by the relation between the flow rate of hydrogen and diffusion rate of nitrogen in the anode gas flow channel 42. Provided that an output current value with which the flow rate of hydrogen and the diffusion rate of nitrogen are in equilibrium is used as a reference value, the more the halt-time target value $I_A$ exceeds the reference value, the more amount of impurity in the anode gas flow channel 42 is reduced. In view of the variation of the diffusion rate of nitrogen, the map shown in FIG. 6 and the halt-time target value $I_A$ are preferably set and corrected based on the gas temperature and the gas pressure in the anode gas flow channel 42.

Embodiment 2

In the embodiment 1, the impurity is discharged when the system is halted. However, in an embodiment 2, a similar discharge control is performed when a request to perform an intermittent operation is issued to the system. The system according to the embodiment 2 has the same configuration as the system according to the embodiment 1. The following description will be made on the assumption that the system according to the embodiment 2 has the configuration shown in FIG. 1, and redundant descriptions will be omitted.

The fuel cell 2 performs a continuous operation in which the fuel cell 2 always generates electric power and an intermittent operation in which electric power generation by the fuel cell 2 is intermittently stopped. When the amount of electric power required by the load 50 is small, electric power generation by the fuel cell 2 can be intermittently stopped to reduce the consumption of hydrogen and improve fuel economy. In the embodiment 2, the ECU 20 transmits a control signal to each component device to perform switching between these operational states as required. Techniques relating to the intermittent operation are well known, and therefore, detailed descriptions thereof will be omitted.

The intermittent operation is preferably started after the anode gas flow channel 42 is purged. Thus, the system according to the embodiment 2 determines whether or not there is a request to perform the intermittent operation while the system is performing the normal operation. If there is a request to perform the intermittent operation, the intermittent operation is started after the discharge of the impurity in the embodiment 1 is performed.

Figure 7:
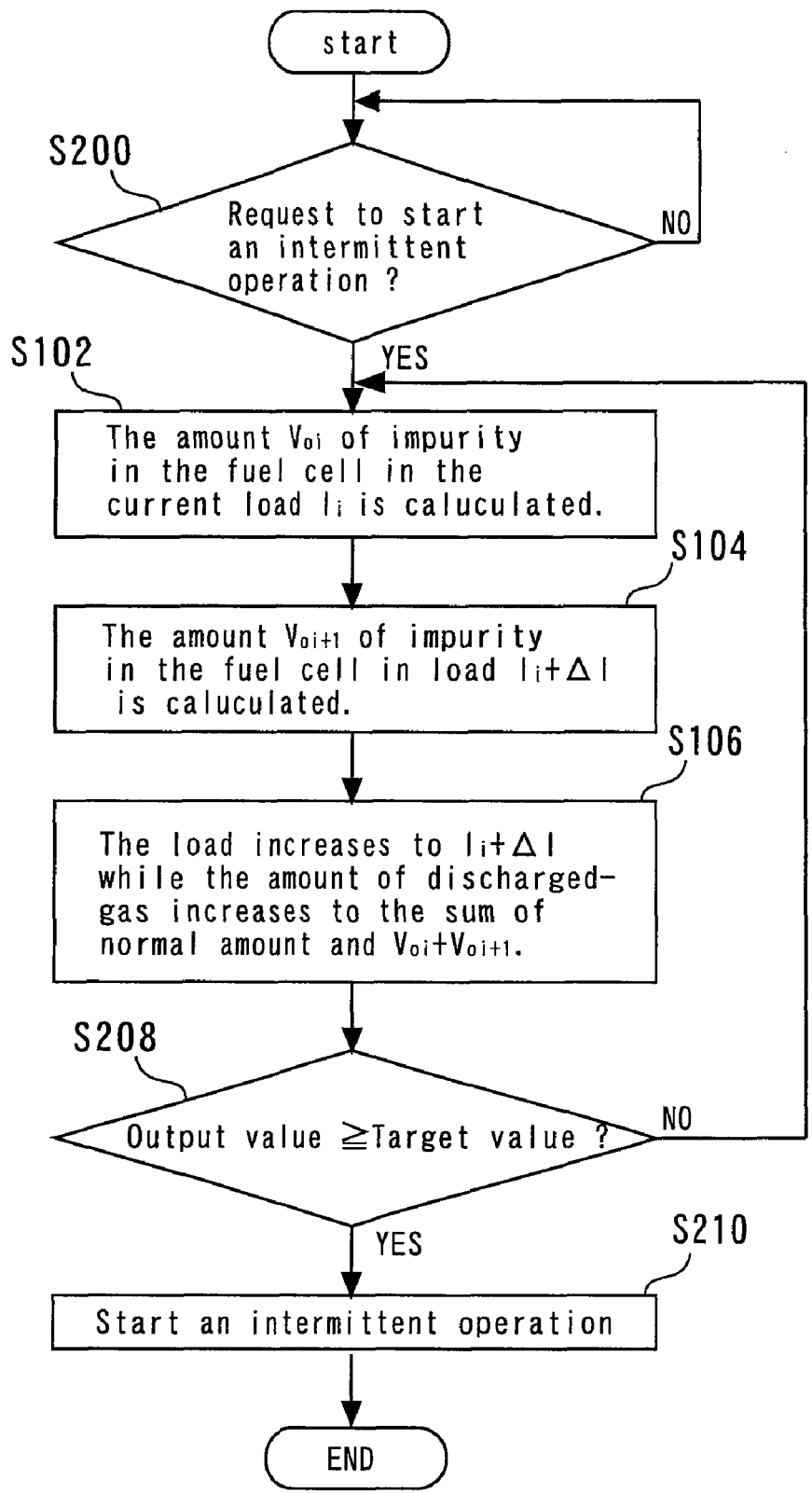
FIG. 7 is a flowchart showing a routine performed by the system according to the embodiment 2.

In the following, a specific process according to the embodiment 2 will be described with reference to the flowchart shown in FIG. 7. The flowchart shown in FIG. 7 is the same as that shown in FIG. 5 except that steps S100, S108 and S110 are replaced with steps S200, S208 and S210, respectively. In the embodiment 2 also, the ECU 20 previously stores a map, such as the map shown in FIG. 6. When the routine shown in FIG. 7 is performed, the map is referred to as in the embodiment 1. In the embodiment 2 also, based on the same concept as the embodiment 1 in which the target value $I_A$ is set, a target value of the output current is previously determined as a value used as a basis for determination of whether or not the amount of impurity is reduced enough to start the intermittent operation.

In the routine shown in FIG. 7, it is first determined whether or not there is a request to start the intermittent operation (step S200). If there is no request to start the intermittent operation, the continuous operation continues. If the condition in step S200 is met, the procedure from step S102 to S106 is performed as in the embodiment 1.

After the processing of step S106 is performed, it is determined whether or not the current load is equal to or greater than the target value (step S208). In the embodiment 2 also, based on the same concept as the embodiment 1 in which the target value $I_A$ is set, the target value of the output current is previously determined. This step allows determination of whether the amount of impurity is sufficiently reduced before the intermittent operation is started. Until the condition in step S208 is met, the procedure from step S102 is repeatedly performed. When the condition in step S208 is met, the process proceeds to a processing of starting the intermittent operation (step S210), and the current routine is ended.

As described above, according to the embodiment 2, after a request to start the intermittent operation, the impurity in the anode gas flow channel 42 can be discharged while suppressing wasteful discharge of hydrogen to the outside of the system. Thus, the operation of the fuel cell 2 can be switched to the intermittent operation after the amount of impurity is reduced while suppressing wasteful discharge of hydrogen.

The embodiment 2 can be combined with the embodiment 1. Alternatively, the embodiment 2 can be modified in the similar ways as in the embodiment 1. That is, the method of the normal operation can be appropriately selected from among the method of switching the operational state between the anode dead end operation and the continuous small amount discharge operation based on a predetermined condition, the method of performing only the continuous small amount discharge operation and the like. The modifications described in the embodiment 1 can be equally applied the system according to the embodiment 2.

Embodiment 3

As described above, during halt of the system in the embodiment 1, or when the intermittent operation is started in the embodiment 2, discharge (purge) is carried out with the impurity collected in the downstream part of the anode gas flow channel 42. According to an embodiment 3, from the viewpoint of widening the application of the discharge control, it is determined whether or not there is a request to perform purging, and the discharge control described above is performed when it is determined that there is a request to perform purging. The system according to the embodiment 3 has the same configuration as the system according to the embodiment 1. The following description will be made on the assumption that the system according to the embodiment 3 has the configuration shown in FIG. 1, and redundant descriptions will be omitted.

Figure 8:
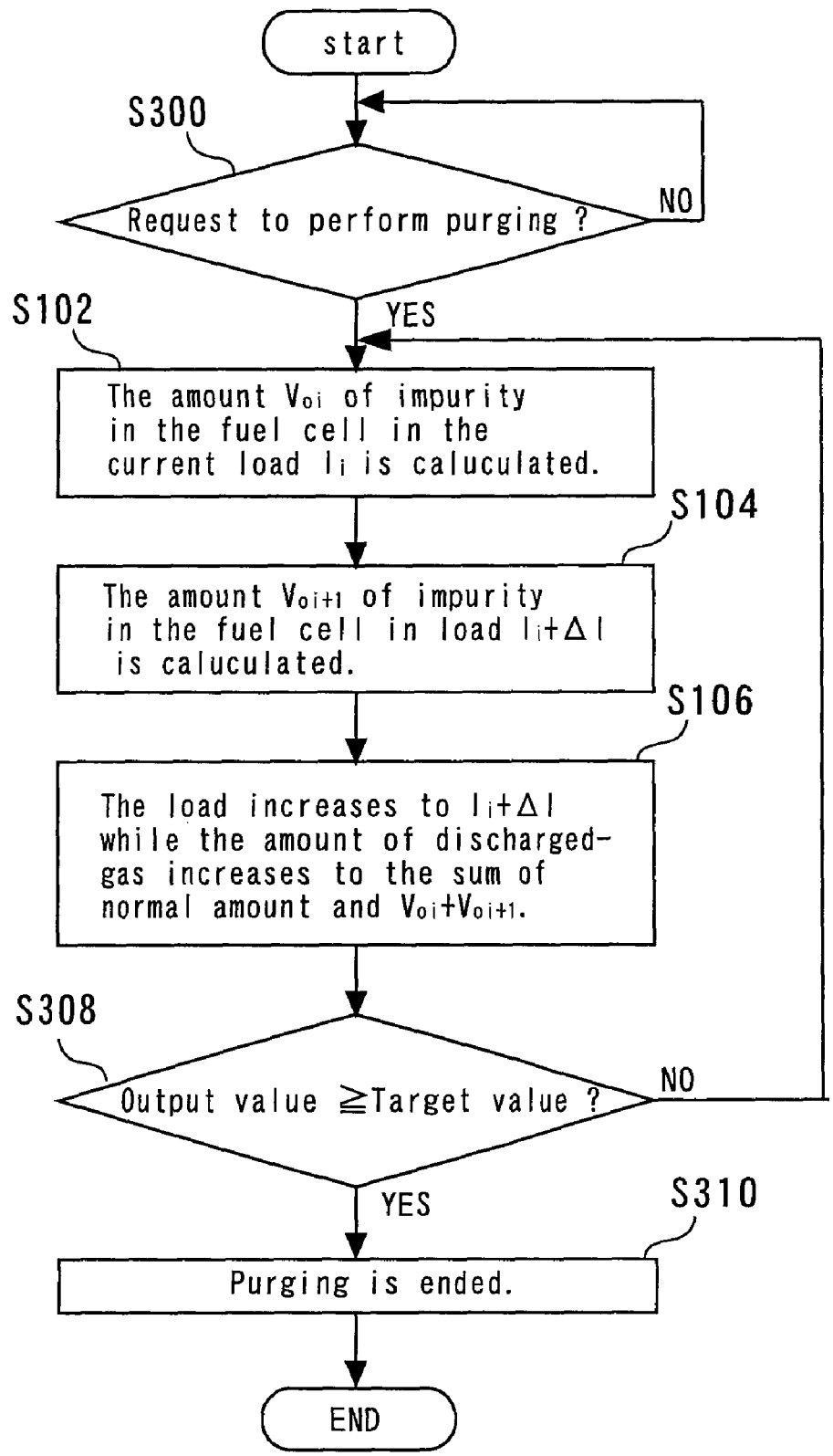
FIG. 8 is a flowchart showing a routine performed by the system according to the embodiment 3.

FIG. 8 is a flowchart showing a routine performed by the system according to the embodiment 3. The routine shown in FIG. 8 is the same as that shown in FIG. 5 except that steps S100, S108 and S110 are replaced with steps S300, S308 and S310, respectively. The system according to the embodiment 3 also sets the map illustrated in FIG. 6 and a target value of the output current as in the embodiments 1 and 2.

In the routine shown in FIG. 8, it is first determined whether or not there is a request to perform purging (step S300). If it is determined that there is no request to perform purging, the current state is maintained, and a request to perform purging is waited for. If it is determined that there is a request to perform purging in step S300, the procedure from step S102 to S106 is performed as in the embodiment 1.

After the processing of step S106 is performed, it is determined whether or not the current output is equal to or higher than the target value (step S308). This step allows determination of whether the amount of impurity is sufficiently reduced. Until the condition in step S308 is met, the procedure from step S102 is repeatedly performed. When the condition in step S308 is met, purging is ended (step S310), and the current routine is ended.

According to the embodiment 3 described above, after a request to perform purging of the fuel cell, the impurity in the anode gas flow channel can be discharged while suppressing wasteful discharge of the fuel gas to the outside of the system.

In the embodiment 3, the processing of step S300 is associated with the "purging request determining means" in the fourth aspect of the present invention described earlier.

In the embodiment 3, if it is determined that a request to perform purging of the fuel cell occurs when a request to halt the fuel cell 2 occurs, the same control as in the embodiment 1 is performed. Furthermore, in the embodiment 3, if it is determined that a request to perform purging of the fuel cell occurs when a request to start the intermittent operation of the fuel cell 2 occurs, the same control as in the embodiment 2 is performed. That is, the embodiment 3 can be applied to various kinds of systems that determine whether there is a purge request or not based on the control or operational state of the fuel cell. In the embodiment 3 also, as in the embodiments 1 and 2, the method of the normal operation of the fuel cell can be appropriately modified. Furthermore, the same modifications as described in the embodiments 1 and 2 can be made.

Embodiment 4

In the embodiments 1 to 3, the output current of the fuel cell 2 is increased with the exhaust valve 14 at the downstream end of the anode gas flow channel 42 set in the exhaust mode. An embodiment 4 is the same as the embodiments 1 to 3 in that the output current value of the fuel cell 2 is increased after a request to stop electric power generation by the fuel cell 2 but differs from those embodiments in control of the exhaust valve 14. The following description will be made on the assumption that the system according to the embodiment 4 has the same configuration as the system according to the embodiment 1 (shown in FIG. 1), and redundant descriptions will be omitted.

Figure 9:
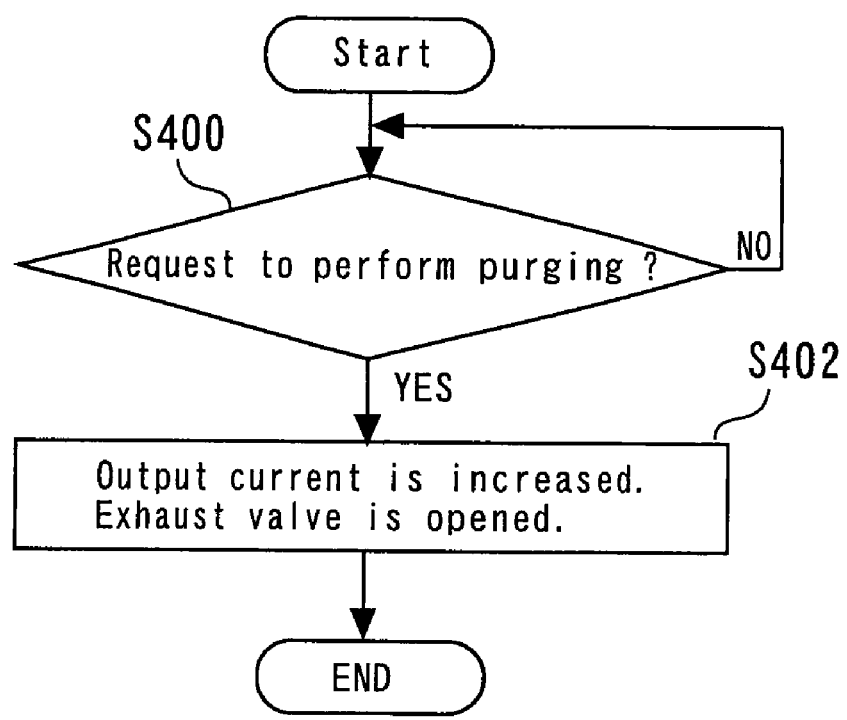
FIG. 9 is a flowchart showing a routine performed by the system according to the embodiment 4.

FIG. 9 is a flowchart showing a routine performed by the system according to the embodiment 4. The system according to the embodiment 4 sets the exhaust valve 14 in the closed mode during the normal operation, and the routine shown in FIG. 9 is performed during such a normal operation. In the routine shown in FIG. 9, it is first determined whether or not there is a request to perform purging (step S400). In this step, as in step S300 in the process according to the embodiment 3 described above, it is determined whether or not there is a request to perform purging of the fuel cell 2. Determination of whether there is a request to perform purging can be made based on a request to halt the fuel cell 2 or a request to perform the intermittent operation of the fuel cell 2, for example, as described in the embodiment 3.

If there is a request to perform purging, the output current of the fuel cell 2 is increased, and then, an exhaust valve 414 is opened. The time of opening the exhaust valve 414 can be after the output current value is increased (at the same time as or after the output current value is increased). As described above, as a result of increasing the output current value, the impurity is collected at the downstream end of the anode gas flow channel 42. According to the embodiment 4, discharge can be performed in a state where the impurity is collected in the downstream part of the anode gas flow channel 42 in this way. Therefore, the impurity in the anode gas flow channel 42 can be discharged while suppressing wasteful discharge of hydrogen to the outside of the system.

The exhaust valve 14 in the embodiment 4 can be a purge valve that can be simply opened and closed. In this case, the normal operation of the system does not involve the exhaust mode, unlike the embodiments 1 to 3. That is, the system performs the purging described above while performing the anode dead end operation.

The invention claimed is:

1. A fuel cell system, comprising:
   a fuel cell that generates an electric power using a fuel gas supplied to an anode thereof and air supplied to a cathode thereof;
   an exhaust mechanism that is connected to a downstream end of an anode gas flow channel and has an exhaust mode in which a substantially smaller amount of gas than the amount of fuel gas consumed in said anode gas flow channel is discharged to the outside of the system;
   output controlling means programmed to increase, based in part on a diffusion rate of an impurity in the anode gas flow channel, the output current value of the fuel cell to a predetermined value after a request to stop electric power generation by said fuel cell; and
   discharge controlling means programmed to set said exhaust mechanism in the exhaust mode before or when said output controlling means increases the output current value.

2. The fuel cell system according to claim 1, wherein said exhaust mechanism is capable of changing a discharge flow rate, and
   said discharge controlling means is programmed to increase, in the exhaust mode, the discharge flow rate of said exhaust mechanism in accordance with the increase of the output current value by said output controlling means.

3. The fuel cell system according to claim 1, further comprising:
   an electric power storage connected to said fuel cell,
   wherein at least part of the increment of the output power due to the increase of the output current value by said output controlling means is stored in said electric power storage.

4. The fuel cell system according to claim 1, wherein the output controlling means is programmed to increase, based on a diffusion rate of an impurity in the anode gas flow channel and a flow rate of the fuel gas, the output current value of the fuel cell to a predetermined value after a request to stop electric power generation by said fuel cell.

5. A fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the amount of fuel gas consumed in said anode gas flow channel is discharged to the outside of the system;
first measuring means that measures a physical quantity relating to the flow rate of the fuel gas in said anode gas flow channel, the physical quantity being an output current of the fuel cell;
second measuring means that measures a physical quantity relating to the diffusion rate of an impurity in said anode gas flow channel;
flow rate controlling means programmed to increase the flow rate of the fuel gas so that the flow rate of the fuel gas in said anode gas flow channel is higher than the diffusion rate of said impurity in the anode gas flow channel after a request to stop electric power generation by said fuel cell; and
discharge controlling means programmed to set said exhaust mechanism in said exhaust mode before or when said flow rate controlling means increases the flow rate of the fuel gas.

6. A fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the amount of fuel gas consumed in said anode gas flow channel is discharged to the outside of the system;
output controlling unit programmed to increase, based in part on a diffusion rate of an impurity in the anode gas flow channel, the output current value of the fuel cell to a predetermined value after a request to stop electric power generation by said fuel cell; and
discharge controlling unit programmed to set said exhaust mechanism in the exhaust mode before or when said output controlling unit increases the output current value.

7. A fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the amount of fuel gas consumed in said anode gas flow channel is discharged to the outside of the system;
first measuring unit that measures a physical quantity relating to the flow rate of the fuel gas in said anode gas flow channel, the physical quantity being an output current of the fuel cell;
second measuring unit that measures a physical quantity relating to the diffusion rate of an impurity in said anode gas flow channel;
flow rate controlling unit programmed to increase the flow rate of the fuel gas so that the flow rate of the fuel gas in said anode gas flow channel is higher than the diffusion rate of said impurity in the anode gas flow channel after a request to stop electric power generation by said fuel cell; and
discharge controlling unit programmed to set said exhaust mechanism in said exhaust mode before or when said flow rate controlling unit increases the flow rate of the fuel gas.

8. A fuel cell system, comprising:
a fuel cell that generates an electric power using a fuel gas supplied to an anode thereof and air supplied to a cathode thereof;
an exhaust mechanism that is connected to a downstream end of an anode gas flow channel and has an exhaust mode in which a substantially smaller amount of gas than the amount of fuel gas consumed in said anode gas flow channel is continuously discharged to the outside of the system;
output controlling means programmed to increase an output current value of the fuel cell to a predetermined value when halting the fuel cell; and
discharge controlling means programmed to set said exhaust mechanism in the exhaust mode before or when said output controlling means increases the output current value, whereby the current value of the fuel cell is increased by the output controlling means in the exhaust mode of the exhaust mechanism when halting the fuel cell.

9. The fuel cell system according to claim 8, wherein said exhaust mechanism is capable of changing a discharge flow rate, and
said discharge controlling means programmed to increase, in the exhaust mode, the discharge flow rate of said exhaust mechanism in accordance with the increase of the output current value by said output controlling means.

10. The fuel cell system according to claim 9, wherein,
the exhaust mechanism includes a duty-controllable electromagnetic exhaust valve, and a duty ratio of the duty-controllable electromagnetic exhaust valve in the exhaust mode is set to carry out a continuous small amount discharge operation.

11. The fuel cell system according to claim 10, wherein,
the duty-controllable electromagnetic exhaust valve is capable of changing the duty ratio, and
the discharge controlling means is programmed to increase, in the exhaust mode, the duty ratio in accordance with the increase of the output current value.

* * * * *